Figure 1:
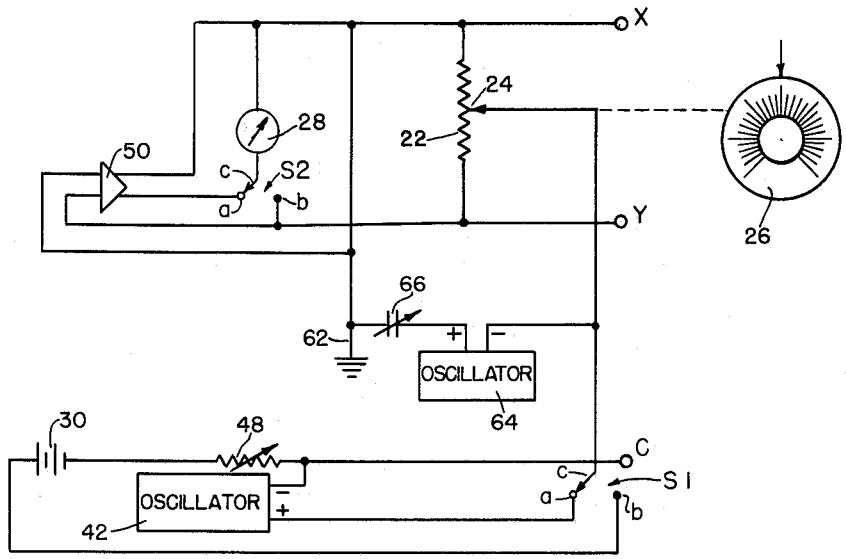

Feb. 8, 1966 J. A. BRAZEE 3,234,459
METHOD AND APPARATUS FOR LOCATING FAULTS IN ELECTRICAL CABLE
LINES BY COMPARING THE IMPEDANCE OF THE ENTIRE FAULTED
LINE TO THE IMPEDANCE OF A SECTION OF THE LINE
Filed Jan. 2, 1959 2 Sheets-Sheet 1

INVENTOR.
JOHN A. BRAZEE
BY
Blair, Spencer & Buckles
ATTORNEYS

INVENTOR.
JOHN A. BRAZEE
BY
Blair, Spencer & Buckles
ATTORNEYS

3,234,459
METHOD AND APPARATUS FOR LOCATING FAULTS IN ELECTRICAL CABLE LINES BY COMPARING THE IMPEDANCE OF THE ENTIRE FAULTED LINE TO THE IMPEDANCE OF A SECTION OF THE LINE

John A. Brazee, Wallingford, Conn., assignor to Whitney Blake Company, New Haven, Conn.
Filed Jan. 2, 1959, Ser. No. 784,709
10 Claims. (Cl. 324—52)

This invention relates to an improved method and apparatus for locating faults in electrical cables and the like. More particularly, it relates to a simple, easy-to-use method and apparatus capable of accurate location of shorts and opens by comparing the impedance of the entire faulted line to the impedance of the section of line between the point of measurement and the fault.

It is well known that the resistance of an electrical conductor varies in direct proportion to its length. Further, the capacitance between the conductor and another conductor in the same cable varies in the same manner, since the spacing between the two conductors, indeed between all other conductors in the cable, is constant throughout its length. Accordingly, it is possible to locate a fault in a conductor by comparing the resistance or capacitance of the section between the fault and one end of the conductor with a standard impedance of known relationship to the length of the line. Ordinarily, capacitance measurements are used for location of breaks and resistance measurements for the location of short circuits; and the measurements are made with bridge circuits which compare the impedance involved in a well-known manner.

A popular system for detecting short circuits is the "Murray loop," in which the resistance between the fault and one end of the faulted line is compared with the resistance of another line in the same cable. The use of this system involves a basic assumption, viz, that the resistance of the standard, i.e., the other line, bears the same relationship to line length as the resistance of the measured section of the faulted line. However, the cross sections of wires of the same gauge vary within relatively wide tolerance limits, and even conductors in the same cable exhibit a relatively wide range of resistance per unit length, since they are drawn through different dies. Furthermore, it may not be feasible to use, as a standard, a line in the same cable, and if another line paralleling the faulted conductor is used, its temperature may be different, thereby adding a further element of error. Also, in many cases it is desirable to make the measurements at a test station in a telephone exchange or the like, from which lead wires connect the faulted cable to the point of measurement. This requires additional computation to eliminate the effect of lead resistance.

A more accurate method of locating shorts is the so-called Three Varley Method. Three measurements are made of various combinations of the faulted conductor, the conductor to which it is shorted and another conductor. By subtraction and division of the results of the various measurements, one may arrive at the ratio of the resistance from the point of measurement to the fault to the entire resistance of the faulted line. The distance to the fault is then computed by multiplying this ratio by the total length of the line. Since the resistance per unit length of a conductor does not vary appreciably along the length thereof, the inaccuracies of the "Murray loop" are largely eliminated. However, fault location is desirably performed by relatively unskilled labor, and it has been found that numerous errors have resulted from the several measurements required and the computations which must be made for a determination of the distance of the fault. Another troublesome factor stems from the necessity of a balance of the bridge circuit; sometimes balance cannot be obtained, requiring a change in the connections for the particular measurement.

The location of breaks has heretofore been accomplished by comparing the capacitance between a section of the faulted conductor and another conductor with the capacitance between another pair of conductors in the same cable. As with resistance, the capacitances between pairs of conductors in a cable may vary rather widely, and therefore these prior systems have been subject to large inaccuracies. It should be noted that an error of as little as a hundred feet in the measured location of a fault in an armored cable suspended on poles or buried in the ground can result in considerable additional expenditure in arriving at its actual location and correction.

Accordingly, it is a principal object of my invention to provide an improved method and apparatus for accurate location of faults in electrical conductors. It is another object of my invention to provide a method and apparatus of the above character capable of locating both short and open circuit faults. A further object of the present invention is to provide a method and apparatus of the above character requiring a minimum number of simple measurements and computations, and thereby lending itself to expeditious operation by unskilled personnel. A still further object of the invention is to provide a method and apparatus of the above character capable of fault location in a line comprising serially connected conductors of different sizes. Yet another object of the invention is to provide apparatus of the above character having high precision and yet readily constructed of relatively low cost components. Other objects of the invention will in part be obvious and will in part appear hereinafter.

The invention accordingly comprises the several steps and the relation of one or more of such steps with respect to each of the others, and the apparatus embodying the features of construction, combinations of elements and arrangements of parts which are adapted to effect such steps, all as exemplified in the following detailed disclosure, and the scope of the invention will be indicated in the claims.

Figure 2:
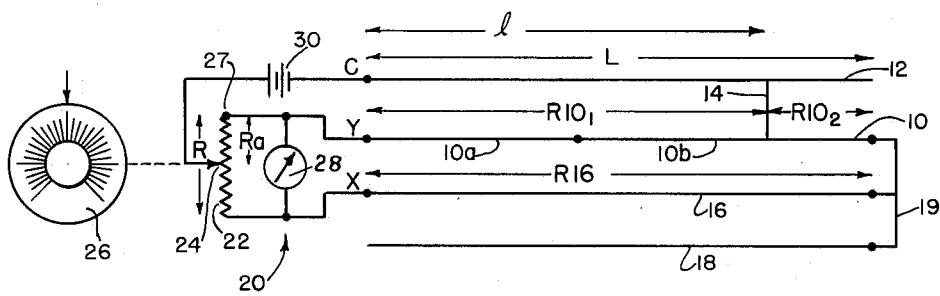
Figure 3:
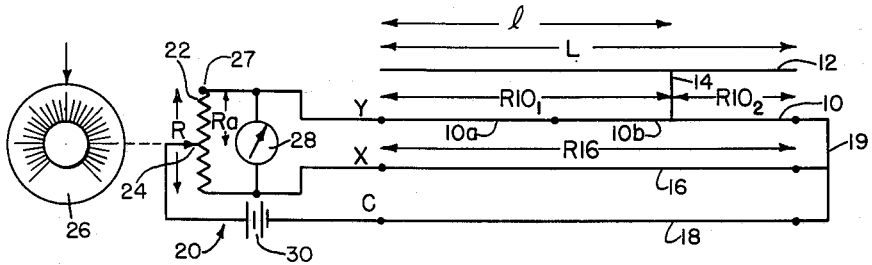
Figure 4:
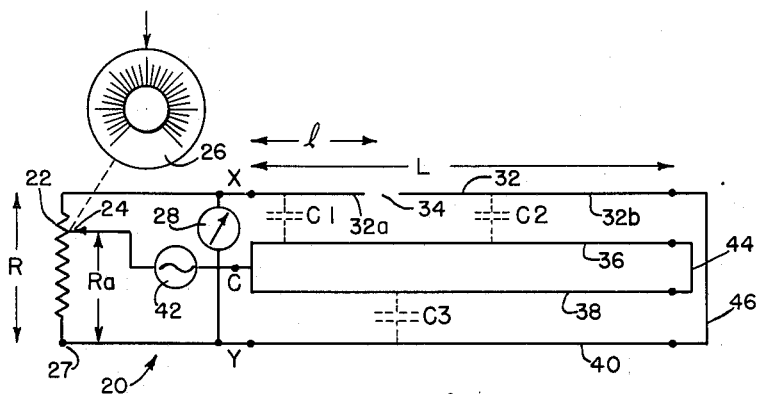
Figure 5:
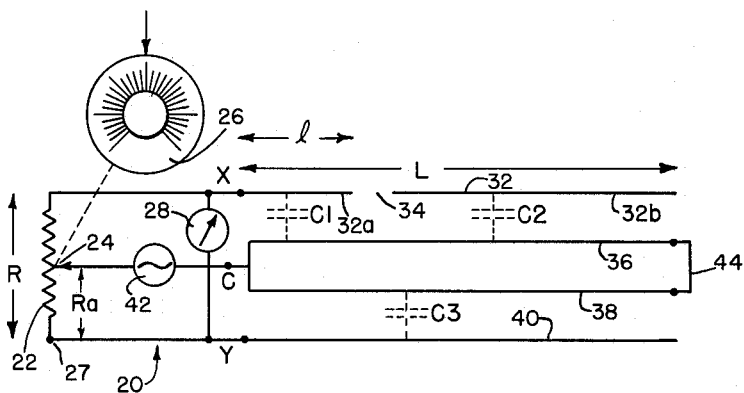

For a fuller understanding of the nature and objects of the invention, reference should be had to the following detailed description taken in connection with the accompanying drawings, in which:

FIGURE 1 is a schematic diagram of a test set circuit adapted for fault location according to my invention, FIGURES 2 and 3 are simplified schematic circuit diagrams showing the operation of the test set of FIGURE 1 in locating a short circuit, and FIGURES 4 and 5 are simplified schematic circuit diagrams showing the operation of the test set of FIGURE 1 in locating an open circuit.

In general, my invention operates to locate a fault by comparing an impedance of the entire faulted line with the impedance of a section between the fault and one end of the line. The ratio between these impedance is the fractional distance of the fault from the end of the line at which the measurements are made. Where the fault is a short circuit, the impedance utilized is the resistance of the line, and where a break or open circuit is to be located, the capacitance between the line and another conductor is utilized. The measurements involved require the balancing of a simple bridge circuit by moving the tap of a potentiometer forming two arms of a simple bridge circuit. The faulted conductors and other conductors form the other arms. The present invention requires but two measurements. One of these determines the ratio of the impedance of the section between the test set and the fault to the sum of the impedances of the entire faulted line and another line. The other determines a ratio relating the impedance of the section in question to another impedance including that of the other line. By simple arithmetic calculation involving the two ratios, one may arrive at a third ratio relating the impedance of the section in question to that of the entire faulted line.

Turning now to FIGURES 2 and 3, a faulted line 10 is short circuited to another conductor 12 as indicated at 14. Conductor 12 may be another line in the same cable as line 10 or in another cable, or it may be the cable armor or sheath or even the ground itself, and thus the term "conductor," as used herein and in the claims, is not restricted to any particular form of electrically conducting medium. Furthermore, the term "short circuit" includes high resistance paths between conductors, since these, as well as low resistance connections, are susceptible of accurate location by the system to be described. Two more conductors, 16 and 18, extend along the length L of the faulted line 10, and a jumper 19 is used to connect the far ends of line 10 and conductors 16 and 18. The present invention is adapted to determine the distance $l$ from one end of the line 10 to the fault 14 in a manner to be described.

More particularly, as shown in FIGURES 2 and 3, a test set generally indicated at 20 includes a potentiometer 22 with a tap 24. The tap is mechanically linked to a dial 26 calibrated in terms of the ratio, $R_a/R$, of the resistance $R_a$ to the tap 24 and one end 27 of the potentiometer 22 to the entire resistance R of the potentiometer. A sensitive current or voltmeter 28 is connected across potentiometer 22 between a pair of terminals X and Y. The test set is completed for the measurements of FIGURES 2 and 3 by a battery 30 connected between the tap 24 and a third terminal C.

Operation of the test set 20 in the location of the fault 14 in line 10 is as follows:

A first measurement is made by connecting the apparatus as shown in FIGURE 3 with the Y and X terminals connected to line 10 and conductor 16 and the C terminal connected to conductor 18. The resulting bridge circuit includes the portions of the potentiometer 22 on either side of the tap 24 as two of its arms; and the line 10 and conductor 16 are the other two arms. The bridge is brought to balance as indicated by a null reading of the meter 28, and the reading of the dial 26 provides the information, $$\frac{R_a}{R} = \frac{R10_1 + R10_2}{R10_1 + R10_2 + R16} = P \quad (1)$$

where $R10_1$ is the resistance of the section of line 10 lying between the Y terminal and the fault 14,
$R10_2$ is the resistance of the remainder of the line 10, and
$R16$ is the resistance of the conductor 16.

The C terminal of the test set 20 is then moved to the conductor 12 for a second measurement, as shown in FIGURE 2. With this connection, two arms of the bridge are, as before, the two portions of the potentiometer 22 on either side of the tap 24. One of the remaining arms consists of the resistance $R10_1$, and the other, resistances $R10_2$ and $R16$. When the bridge is balanced, dial 26 indicates, $$\frac{R_a}{R} = \frac{R10_1}{R10_1 + R10_2 + R16} = K$$

Thus, $$\frac{K}{P} = \frac{R10}{R10_1 + R10_2} = \frac{l}{L} \quad (3)$$

The latter fraction $l/L$ is the fractional distance of the fault 14 from the near end of the line 10 connected to the test set 20. Multiplication of this fraction by the known length L of the faulted line gives the actual distance of the fault 14 in units of length.

It is seen that only two readings on the test set 20 are required for location of the fault 14. These readings are easily taken from the dial 26, and between readings only one connection, that of the C terminal, is changed. Furthermore, the computation required to convert the readings into the location of the fault is elementary in nature and easily handled by personnel having minimum training.

In some cases, the faulted line 10 may comprise two conductors 10$a$ and 10$b$ (FIGURES 2 and 3) of different sizes or gauges. In that event, the line would be termed a mixed gauge line having two mixed gauges as shown. The location of a fault in a mixed gauge line, by my invention, involves the same measurements as those described above for a single gauge line. The connections and readings taken are exactly the same. However, the computation is somewhat different. If section 10$a$ closest to the test set 20 were shorted, the measured value of K, as determined above, would be less than $$\frac{L_1}{L_1 + ML_2} \quad (4)$$

where $L_1$ is the length of the near section 10$a$,
$L_2$ is the length of the far section 10$b$, and
$M$ is the nominal resistance per unit length for the gauge size of the second section divided by the nominal resistance per unit length of the gauge size in the first section, and the distance to the fault from the test set 20 would be $$\left(\frac{K}{P}\right)(L_1 + ML_2) \quad (5)$$

In the example shown, fault 14 is in the second section 10$b$, and this would be indicated by a value of K greater than $$\frac{L_1}{L_1 + ML_2}$$

The distance to the fault would be given by $$\left(\frac{K}{P}\right)\left(\frac{1}{M}\right)(L_1 + ML_2) - \frac{L_1}{M} + L_1 \quad (6)$$

Again, the computations required are simpler than those used in other fault locating systems capable of reasonable accuracy.

Similar expressions may be derived for location of faults in lines having any number of mixed gauges. For maximum accuracy, however, I prefer to determine first the section containing the fault from Expression 4, or similar expressions for greater numbers of mixed gauges, then disconnect the section in order to make a direct measurement on it.

In FIGURES 4 and 5, I have illustrated a line 32 having a fault 34 in the form of a break or open circuit to be located by use of the test set 20. Conductors 36, 38 and 40 extending between the ends of the faulted line 32 are also used in the required measurements. The test set 20 utilizes an alternating current generator illustratively indicated at 42 in place of the battery 30 of FIGURES 2 and 3 in order to make use of the capacitances between certain of the conductors in determining the distance $l$ to the fault 34.

More particularly, between conductor 36 and the near section 32$a$ of line 32 there is a capacitance C1, and between conductor 36 and the far section 32$b$ of the faulted line, there is a capacitance C2. Further, there is a capacitance C3 between conductors 38 and 40. The X and Y terminals of the test set 20 are connected to section 32$a$ and conductor 40, respectively, and terminal C is connected to conductors 36 and 38. A jumper 44 connects the ends of conductors 36 and 38 remote from the test set, and for one of the measurements (FIGURE 4), a second jumper 46 connects the far ends of line 32 and conductor 40. Thus, in FIGURE 4, a bridge circuit is formed having as two of its arms the portions of the potentiometer 22 on either side of the tap 24. One of the other arms comprises the capacitance C1 and the other includes capacitances C2 and C3. Accordingly, when the bridge is brought to balance as indicated by the meter 28, the dial 26 indicates, $$\frac{R_a}{R} = \frac{C1}{C1+C2+C3} = K \qquad (7)$$

Jumper 46 is then removed and a second measurement taken with the connections shown in FIGURE 5. With the bridge at balance $$\frac{R_a}{R} = \frac{C1}{C1+C3} = P \qquad (8)$$

It can be shown that $$\frac{PK}{PK+(P-K)} = \frac{C1}{C1+C2} \qquad (9)$$

The right-hand side of Equation 9 is the ratio of the capacitance of section 32a of the faulted line 32 to the entire capacitance between the line and conductor 36 and is therefore equal to the fractional distance, $l/L$ of the fault 34 from the near end of line 32. Accordingly, one may determine the actual distance to the fault 34 by performing the arithmetic operations on the measured values of K and P indicated in the left-hand side of Equation 9 and multiplying the resulting fraction by the total length L of the line 32.

The above method of locating breaks in lines is substantially more accurate than prior methods, since the capacitances C1 and C2 are determined by the insulation between the line 32 and the conductor 36. The insulation around a given conductor is essentially constant over the length thereof, and therefore the capacitance between two such conductors will vary almost exactly linearly with the distance. Accordingly, the fraction $$\frac{C1}{C1+C2}$$

of the total capacitance $(C1+C2)$ is an accurate indication of the distance to the fault 34. On the other hand, prior methods have utilized the nominal capacitance per unit length between conductors or have compared various capacitances along the faulted conductor with the capacitance between two conductors of an entirely different pair. Because of the variation in conductor insulation permitted by the tolerance ranges, considerable inaccuracies resulted from these prior systems.

The two measurements described above may also be used in locating a break in a mixed capacitance line, i.e., a line having segments of different capacitances. For example, if the line comprises segments of two different capacitances, and the break is in the near segment connected to the test set 20, the measured value of K will be less than, $$\frac{L_1}{L_1+NL_2} \qquad (10)$$

where $L_1$ is the length of the near segment,
$L_2$ is the length of the remote segment, and
$N$ is the nominal capacitance per unit length between the line 32 and conductor 36 in the near segment divided by the nominal capacitance between the line and conductor 36 in the remote segment, where the break is in the near segment, the distance thereof from the test set is given by $$\frac{PK}{PK+P-K}[L_1+NL_2] \qquad (11)$$

If the break is in the remote segment, the distance is given by $$\frac{1}{N}\left(\frac{PK}{PK+P-K}\right)(L_1+NL_2) - \frac{L}{N} + L \qquad (12)$$

For maximum accuracy, it is again advisable to locate the section in which the break has occurred and then isolate this section for further measurement in the manner described above for a one-gauge line. The jumper connections 44 and 46 at the remote ends of the conductors may, of course, be made by latching type relays energized from the end at which the test set measurements are made.

Turning now to FIGURE 1, showing the test set in greater detail, the battery 30 is connected in series with a variable sensitivity adjusting resistor 48. Preferably, the generator 42 takes the form of an oscillator connected between the C terminal and contact $S1_a$ of a switch S1, while battery 30 is connected to a contact $S1_b$. The movable contact or wiper $S1_c$ of switch S1 is connected to the sliding tap 24 of potentiometer 22, and thus the excitation of the bridge circuit of which potentiometer 22 is a part may be changed from alternating to direct-current by proper setting of this switch.

The meter 28 is connected between the X terminal and the movable contact $S2_c$ of a switch S2. A contact $S2_b$ is connected to the Y terminal, and a contact $S2_a$ is connected to the output of an amplifier 50 whose input is derived from the voltage between the X and Y terminals. The X terminal is grounded to a chassis in the test set as indicated at 62, the latter being isolated from the actual earth ground. Illustratively, an oscillator 64, whose frequency is the same as that of generator 42, is connected in series with a capacitor 66 between the tap 24 and chassis ground 62. The amplifier 50 preferably includes a suitable rectifier so that the meter 28 connected to its output may be a direct current meter of suitable construction. Thus, with switches S1 and S2 in the positions shown in FIGURE 1, test set 20 is arranged as shown in simplified form in FIGURES 4 and 5, adapted for location of a break in a conductor. When the switches which may be ganged for ease of manipulation, are in the other or "b" positions, the test set circuit of FIGURES 1 and 2 is achieved.

The purpose of oscillator 64 and capacitor 66 is to eliminate the effect of the capacitance between the test set and actual ground. Stray capacitances always exist between the test set chassis (and the X terminal connected thereto) and the earth, and also between the earth and the conductors connected to the C and Y terminals. In fact, the conductor 36 or 38 (FIGURES 4 and 5) may in some instances be the earth or cable armor in electrical contact therewith. Thus, there are resultant stray capacitances between the X terminal and the C and Y terminals. Referring to FIGURES 4 and 5, it is seen that the stray capacitance (not shown) between the X and Y terminals is across the entire potentiometer 22 and therefore does not affect balance of the measuring bridge circuit. However, the stray capacitance (not shown) between the X and C terminals is in parallel with the capacitance C1 and therefore will affect bridge balance and result in inaccurate measurement of the ratio $$\frac{C1}{C1+C2}$$

Returning to FIGURE 1, the oscillator 64 operates at the same frequency as oscillator 42 and in phase opposition therewith, as indicated by the polarity signs. Accordingly, oscillator 64 applies a signal between the X terminal and tap 24 in phase opposition to the current from generator 42 between these points through the stray capacitances. Capacitor 66 is adjusted so that the two currents are equal in magnitude, thereby cancelling the effect of such capacitances. In practice, I have found that capacitor 66 may be set in the factory and remain fixed thereafter in most applications. It will be apparent that oscillator 64 and generator 42 may be combined, so long as the respective outputs are isolated sufficiently from each other.

The capacitance cancelling feature of the test set 20 is also of importance in making certain measurements, other than those described above, wherein the test set is used as a straight capacitance bridge for more direct measurement of the capacitance ratios in a broken line. This latter type of measurement is often made where a line has two breaks, and the distance to one from one end of the line is known. Referring to FIGURES 4 and 5, it should be noted at this point that voltages will be induced by the excitation from the generator 42 in other conductors (not shown) capacitively coupled to those used in the measurements. However, these signals have no effect on the measurements taken with my system inasmuch as they are self-cancelling in nature.

The frequency of the generator 42 should be sufficiently low that the reactances of the measured capacitances are substantially less than the resistances and self inductances of the conductors used in the measurements, but high enough to provide unbalance currents of a magnitude easily amplified to an acceptable level by the amplifier 50. Further, the frequency should be different from that of any stray spurious signals which may be picked up by the conductors used in the measurements, most notably, the standard power line frequency of 60 cycles per second and harmonics thereof. I have found that 100 cycles per second is a suitable excitation frequency in view of these factors. Moreover, when such spurious signals are received, means should be provided to differentiate them from the bridge unbalance signal; and, accordingly, earphones may be substituted for the meter 28 and the amplifier 50, whereby the operator may determine by ear when an actual bridge null is obtained.

Thus, I have described an improved system for locating faults in electrical conductors. The faults are located by comparing an impedance of the section of the faulted line between the fault and the test set to the impedance of the entire line, thereby affording a high degree of accuracy. Where the fault is a short circuit or similar failure, the impedance utilized is the electrical resistance of the line, and where the fault is a break or other failure having a like effect, the impedance utilized is the capacitance between the conductor and other conductors extending parallel thereto. In either case, but two measurements are required, both of these being from the same end of the line. From the readings obtained, the fractional distances of the faults from the measured ends of the faulted lines may easily be computed. The method is thus susceptible of practice by relatively untrained, unskilled personnel. Moreover, the apparatus described above is simple in nature and of relatively low cost construction while providing accuracy of fault locating, including compensation for stray capacitances. It is easy to set up in the field and simple to operate.

Further, it will be noted that the only high precision component in the test set 20 is the potentiometer 22, whereas in prior instruments, precision resistors of both a fixed and variable nature were required. It is well known that a high precision potentiometer, providing a voltage or resistance ratio rather than an actual resistance value, is much less costly to construct and calibrate than a variable resistor of the same precision.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A method of locating a break in a faulted first conductor in a first pair of conductors from one end thereof by comparing the capacitance between one section of said faulted first conductor and the second conductor of said first pair with the entire capacitance between said conductors, said method comprising the steps of measuring the ratio of said capacitance of said section to the capacitance of the entire faulted conductor plus the capacitance between third and fourth conductors extending from one end of said first pair to the other, and measuring the ratio of said capacitance of said section to that of said section plus that between said third and fourth conductors.

2. The method defined in claim 1 in which said measuring steps are performed at said one end of said conductors and in which the first-mentioned of said measuring steps is performed with the end of said faulted first conductor remote from said one end connected to the remote end of said third conductor and the remote end of said second conductor is connected to the remote end of said fourth conductor.

3. The method defined in claim 1 in which said measurements are accomplished by connecting a potentiometer across the near ends of said first and third conductors, said potentiometer having a movable tap, whereby the potentiometer impedances on either side of said tap and the line capacitances connected to said potentiometer form a bridge circuit, said method also including the application of excitation between a pair of opposite terminals of said bridge circuit and the adjustment of said tap to provide a null voltage between the remaining terminals of said bridge.

4. The method defined in claim 2 in which during the second-mentioned of said measuring steps the only connection between the remote ends of said conductors is a connection between said second conductor and said fourth conductor.

5. In a method for locating a fault in the form of a break or the like in a first conductor by means of two measurements made at one end of said first conductor so as to compare the capacitance between one section of said first conductor and conducting means that extend with said first conductor between the near and remote ends thereof with the entire capacitance between said first conductor and said conducting means; said method utilizing a further conductor extending between said near and remote ends of said first conductor; the steps of connecting the end terminals of a potentiometer across the near ends of said first and further conductors, said potentiometer having a calibrated movable tap; connecting excitation means and a detector in such manner as to form a first bridge circuit two of whose arms are the portions of said potentiometer on either side of said tap and whose other arms include the capacitances between each of said first and further conductors and said conducting means; adjusting said tap to null said first bridge circuit; determining at the null position of the potentiometer the ratio of the resistance of said potentiometer between said tap and one end of said potentiometer to the total resistance of said potentiometer; forming a further bridge circuit by further connecting together the remote ends of said first and further conductors; adjusting said tap to null said second bridge circuit determining at the null position of said second bridge circuit the ratio of the resistance of said potentiometer between said tap and one end of said potentiometer to the total resistance of said potentiometer; and combining said determined ratios to provide said comparison.

6. The method defined in claim 5 in which said first and further conductors are in different pairs of conductors and comprising the further step of connecting in parallel the conductors paired with said first and further conductors thereby to form said conducting means.

7. In a method for locating a fault in the form of a break or the like in a first conductor that extends from either side of said break between near and far ends, said method locating said break from said near end of said first conductor by comparing a first capacitance consisting of the capacitance between the section of said first conductor between said near end and said fault and a second conductor co-extensive with said first conductor between said near and far ends with the entire capacitance between said first and second conductors, the steps of connecting said first and second conductors with a third conductor co-extensive with said first conductor between said near and far ends and with two relatively inversely-variable impedance elements to form a first bridge circuit that can be balanced to measure, as a first number N1, the ratio of said first capacitance to the sum of said entire capacitance plus the capacitance between said second and third conductors, and connecting said first and third conductors with said impedance elements to form a second bridge circuit that can be balanced to measure, as a second number N2, the ratio of said first capacitance to the sum of said first capacitance plus the capacitance between said second and third conductors.

8. The method defined in claim 7 comprising the further steps of determining the distance L along the path of said first conductor between said near and far ends thereof, and determining the distance $l$ from said near end to said fault by combining said numbers according to the formula $$l = \left[ \frac{(N1)(N2)}{(N1)(N2)+(N2-N1)} \right] \left[ L \right]$$

9. A test set adapted for location of a fault in an electrical conductor, said test set comprising, in combination, a potentiometer having first and second ends and a movable tap, a first terminal connected to said first end of said potentiometer and a second terminal connected to said second end thereof, indicating means adapted to indicate the proportion of the entire impedance of said potentiometer between said tap and one of said ends, a third terminal, a direct-current source and a first alternating-current source, means for alternatively connecting said sources between said tap and said third terminal, voltage indicating means connected to said first and second ends of said potentiometer and adapted thereby to determine the voltage across said potentiometer, said first end of said potentiometer being connected to a metallic chassis in said test set, and a second alternating-current source adapted to apply a compensating signal between said tap and said first end substantially equal in frequency and magnitude and opposite in phase to the signal appearing across said tap and first end from said first source through stray capacitance in the measuring system incorporating said test set.

10. The combination defined in claim 9 in which said second alternating-current source includes an oscillator whose output is in series with a variable impedance element, thereby to facilitate adjustment of the characteristics of said compensating signal.

References Cited by the Examiner

UNITED STATES PATENTS

| | | | |
|---|---|---|---|
| 1,034,609 | 8/1912 | Friendly | 324—52 |
| 1,871,967 | 8/1932 | Edwards et al. | 324—52 |
| 2,551,942 | 5/1951 | Greene | 324—52 |
| 2,615,076 | 10/1952 | Miller | 324—52 |

OTHER REFERENCES

"Laying Cable in the Forward Area," pamphlet by Signal Corps, U.S. Army, released Jan. 31, 1923, pp. 17, 18 and 19.

Northrup: article entitled, "Two Simple Methods for locating Faults in Cables," pp. 278, 279 of "Electrical Review" for Aug. 29, 1903, vol. 43, No. 9.

WALTER L. CARLSON, *Primary Examiner.*

SAMUEL BERNSTEIN, LLOYD McCOLLUM, FREDERICK M. STRADER, *Examiners.*